(12) United States Patent
Rowton

(10) Patent No.: US 10,883,655 B1
(45) Date of Patent: Jan. 5, 2021

(54) ROTATIONAL BRACKET ASSEMBLY

(71) Applicant: Nick Rowton, Minden, LA (US)

(72) Inventor: Nick Rowton, Minden, LA (US)

( * ) Notice: Subject to any disclaimer, the term of this patent is extended or adjusted under 35 U.S.C. 154(b) by 0 days.

(21) Appl. No.: 16/515,579

(22) Filed: Jul. 18, 2019

(51) Int. Cl.
  *F16M 11/00* (2006.01)
  *F16M 13/02* (2006.01)
  *A01M 31/02* (2006.01)

(52) U.S. Cl.
  CPC .......... *F16M 13/022* (2013.01); *A01M 31/02* (2013.01)

(58) Field of Classification Search
  CPC .... F16M 11/00; F16M 11/2057; A01M 21/02
  See application file for complete search history.

(56) References Cited

U.S. PATENT DOCUMENTS

| 8,708,592 B1* | 4/2014 | Gardner | F16M 11/2057 |
| | | | 182/187 |
| 2008/0169156 A1* | 7/2008 | Leishman | A01M 31/02 |
| | | | 182/187 |
| 2011/0226553 A1* | 9/2011 | Ekes, II | A01M 31/02 |
| | | | 182/188 |

* cited by examiner

*Primary Examiner* — Amy J. Sterling
(74) *Attorney, Agent, or Firm* — R. Keith Harrison

(57) ABSTRACT

A rotational bracket assembly suitable for securing a platform to a support at a selected angle with respect to the support may include a frame configured to be secured to the support. A rotational platform mount may be carried by the frame. The rotational platform mount may include a rotational platform mount housing. A lock disk may be disposed for rotation in the rotational platform mount housing. A locking mechanism may be carried by the rotational platform mount housing. The locking mechanism may be configurable between a lock position detachably engaging the lock disk to prevent rotation of the lock disk in the rotational platform mount housing and a release position disengaging the lock disk to facilitate rotation of the lock disk in the rotational platform mount housing. A platform support member may extend from and rotate with the lock disk. The platform support member may be configured to support the platform.

20 Claims, 3 Drawing Sheets

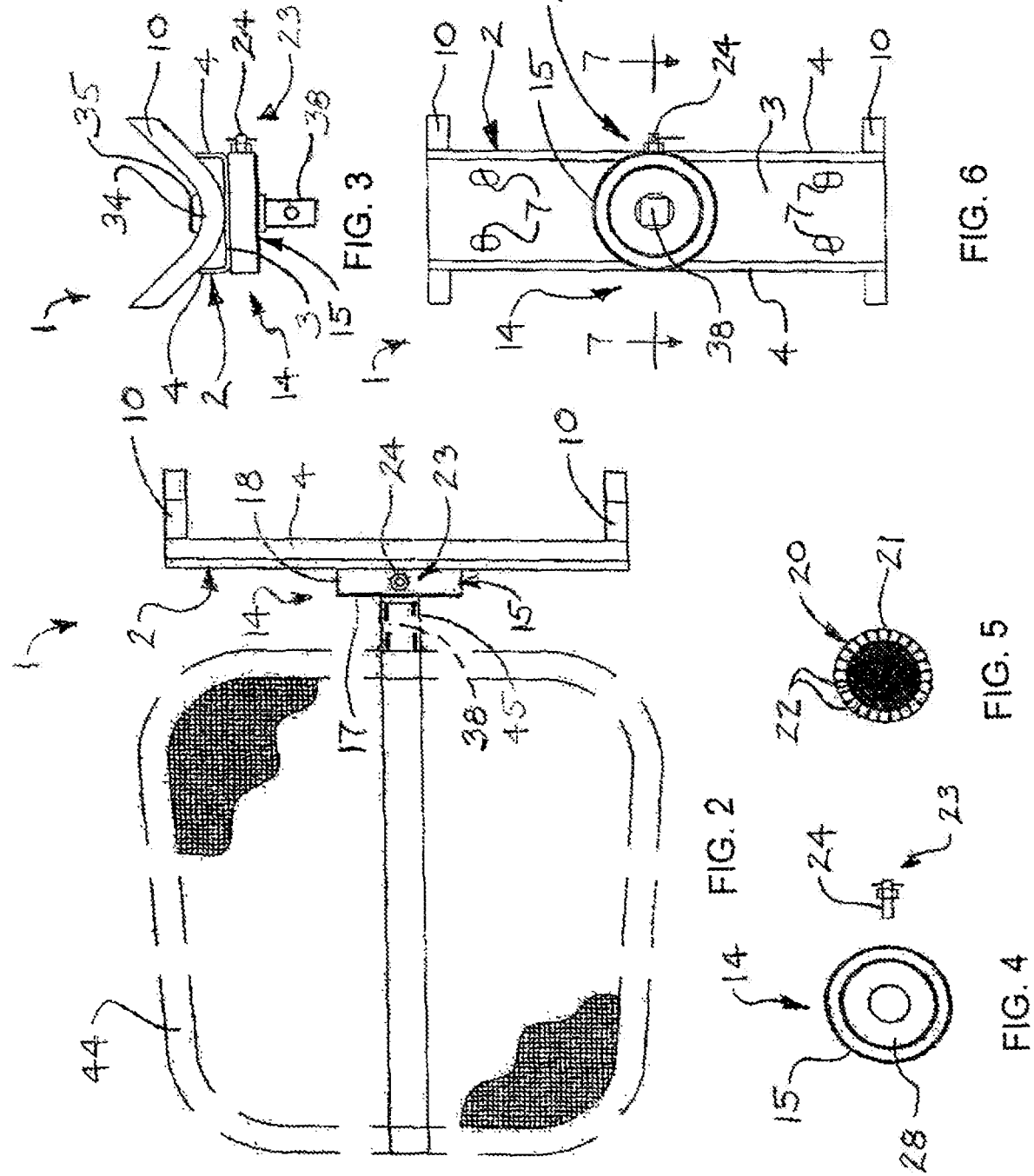

ROTATIONAL BRACKET ASSEMBLY

FIELD

Illustrative embodiments of the disclosure generally relate to devices suitable for mounting a dog tree stand or other platform on a support. More particularly, illustrative embodiments of the disclosure relate to a rotational bracket assembly which is suitable to facilitate deployment of a dog tree stand or other platform at a selected angle.

BACKGROUND

The background description provided herein is solely for the purpose of generally presenting the context of the illustrative embodiments of the disclosure. Aspects of the background description are neither expressly nor impliedly admitted as prior art against the claimed subject matter.

Tree stands are often used to support a hunter above the ground in a hunting area. Tree stands may be attached to a tree or other support or may be self-standing. In some applications, dog tree stands may be deployed on a tree or other support to support a hunting dog in an elevated position away from water or other hazards to await retrieval of a game animal during a hunt.

In some applications, it may be desirable to adjust the angle of a dog tree stand such as in the event that the dog tree stand is attached to a tree or other support which is leaning at an angle.

Accordingly, a rotational bracket assembly which facilitates deployment of a dog tree stand or other platform at a selected angle may be desirable for some applications.

SUMMARY

Illustrative embodiments of the disclosure are generally directed to a rotational bracket assembly suitable for securing a platform to a support at a selected angle. An illustrative embodiment of the rotational bracket assembly may include a frame configured to be secured to the support. A rotational platform mount may be carried by the frame. The rotational platform mount may include a rotational platform mount housing. A lock disk may be disposed for rotation in the rotational platform mount housing. A locking mechanism may be carried by the rotational platform mount housing. The locking mechanism may be configurable between a lock position detachably engaging the lock disk to prevent rotation of the lock disk in the rotational platform mount housing and a release position disengaging the lock disk to facilitate rotation of the lock disk in the rotational platform mount housing. A platform support member may extend from and rotate with the lock disk. The platform support member may be configured to support the platform.

BRIEF DESCRIPTION OF THE DRAWINGS

Illustrative embodiments of the disclosure will now be described, by way of example, with reference to the accompanying drawings, in which:

FIG. 2 is a side view of the illustrative rotational bracket assembly with a platform (illustrated in phantom) attached to the rotational bracket assembly in typical application of the assembly;

FIG. 3 is a top view of the illustrative rotational bracket assembly;

FIG. 4 is an exploded rear view of a typical rotational platform mount and locking mechanism of the rotational bracket assembly:

FIG. 5 is a cross-sectional view of a typical lock disk of the rotational platform mount;

FIG. 6 is a front view of the illustrative rotational bracket assembly; and

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear" "right", "front". "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
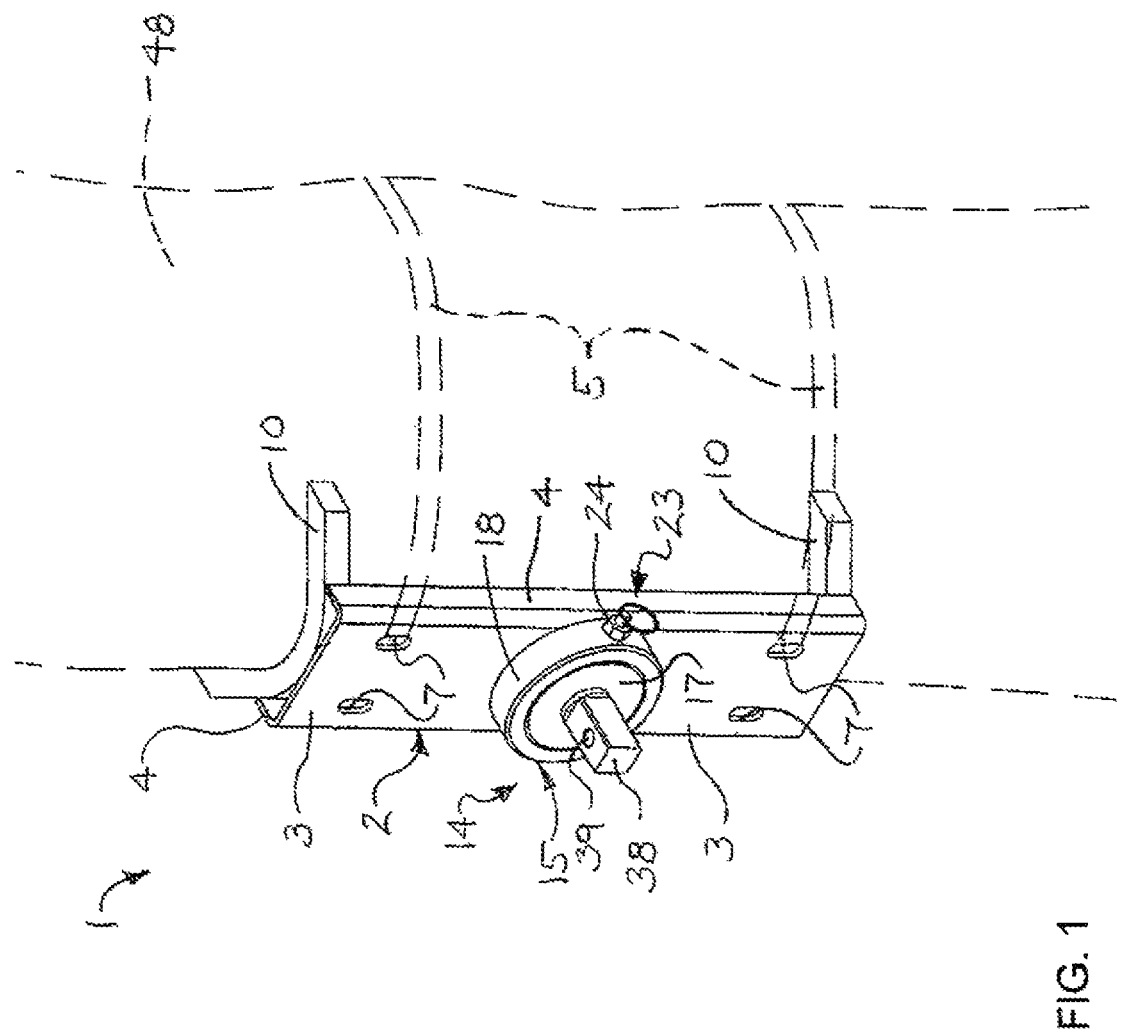
FIG. 1 is a front perspective view of an illustrative embodiment of the rotational bracket assembly, mounted on a support (illustrated in phantom) in typical application of the assembly.

Referring to the drawings, an illustrative embodiment of the rotational bracket assembly is generally indicated by reference numeral 1. As illustrated in FIGS. 1 and 2 and will be hereinafter described, in typical application, the rotational bracket assembly 1 may be attached to a support 48. A platform 44 may be attached to the rotational bracket assembly 1. The rotational bracket assembly 1 may support the platform 44 at a selected angular orientation with respect to the support 48 and the ground and/or a horizontal plane. In some applications, the platform 44 may include a dog stand which may be used to support a hunting dog (not illustrated) in hunting applications. It will be appreciated that the rotational bracket assembly 1 may be used in various other applications.

Figure 7:
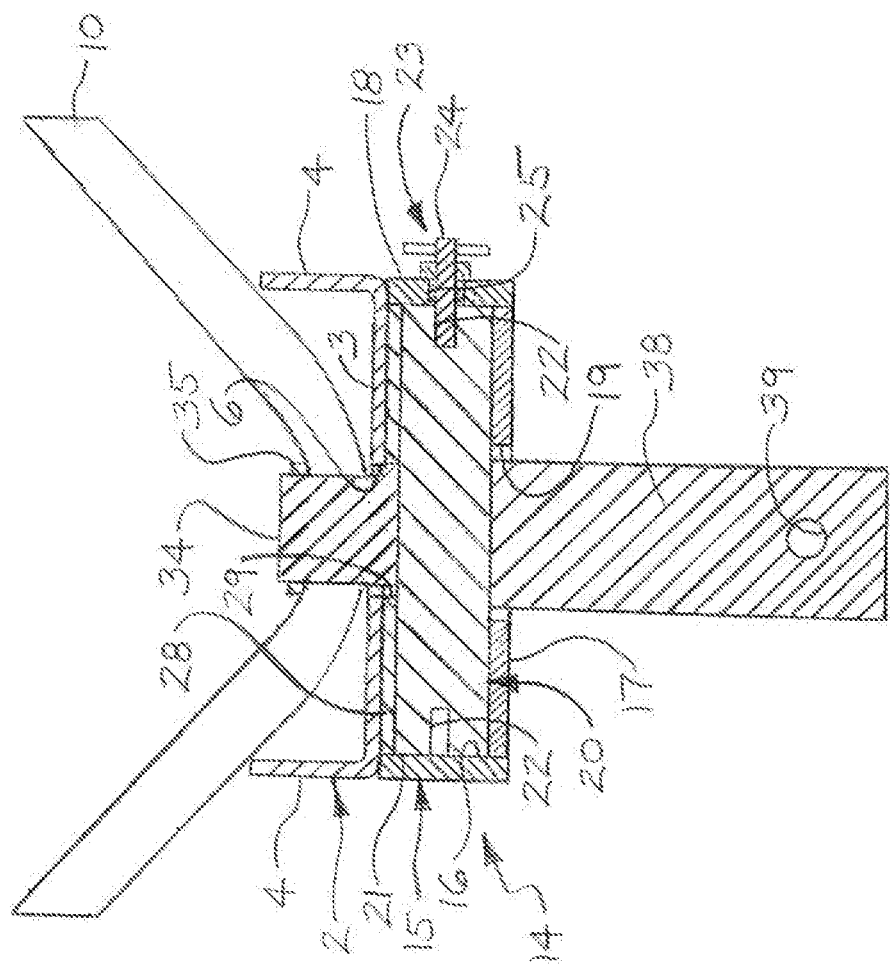
FIG. 7 is a cross-sectional view, taken along section lines 7-7 in FIG. 6.

The rotational bracket assembly 1 may include a frame 2. The frame 2 may be configured to be secured to the support 48 typically in a manner which will be hereinafter described. In some embodiments, the frame 2 may include a frame plate 3 which may be elongated and rectangular. A pair of spaced-apart, parallel plate flanges 4 may extend from the opposite longitudinal frame plate side edges of the frame plate 3. In some embodiments, a pair of spaced-apart support engaging flanges 10 may extend from the frame plate 3, the plate flanges 4 and/or other component or element of the frame 2 at a 90-degree or other angle. In some embodiments, the support engaging flanges 10 may be attached to the frame plate 3 via welding and/or mechanical fasteners, for example and without limitation. In other embodiments, the support engaging flanges 10 may be casted, molded or otherwise fabricated in one piece with the frame 2. The support engaging flanges 10 may have a perpendicular or 90-degree configuration or orientation and may be configured to engage the support 48 in typical application of the rotational bracket assembly 1, as illustrated in FIG. 1 and will be hereinafter described. Each support engaging flange 10 may have a solid or hollow square, circular or other cross-sectional configuration. As illustrated in FIG. 7, in some embodiments, a disk pin opening 6 may extend through the frame plate 3 of the frame 2 for purposes which will be hereinafter described.

The frame 2 may be secured to the support 48 according to any suitable technique which is known by those skilled in the art and suitable for the purpose. As illustrated in FIG. 1, in some embodiments, at least one pair of spaced-apart assembly mount member openings 7 may extend through the frame plate 3. An assembly mount member 5 may extend through, hook into or otherwise engage the assembly mount member openings 7. The assembly mount member 5 may be securable around the support 48 according to the knowledge of those skilled in the art. In some embodiments, the assembly mount member 5 may include one or more strips or straps of nylon, rubber and/or other flexible material which can be extended around the support 48 and secured using a buckle, clamp or other suitable fastening mechanism. For example and without limitation, in some embodiments, the assembly mount member 5 may include ratchet straps.

A rotational platform mount 14 may be provided on the frame 2. The rotational platform mount 14 may include a rotational platform mount housing 15 which may be provided on the frame plate 3 of the frame 2. As illustrated in FIGS. 1 and 6, in some embodiments, the rotational platform mount housing 15 may be provided substantially at the center of the frame plate 3. In other embodiments, the rotational platform mount housing 15 may be provided at any other location or position on the frame plate 3.

As illustrated in FIG. 7, the rotational platform mount housing 15 may include a side housing portion 18. The side housing portion 18 may be ring-shaped, cylindrical or annular. A front housing portion 17 may be provided on the side housing portion 18. The front housing portion 17 may be fabricated in one piece with the side housing portion 18 or may be fabricated separately and welded and/or otherwise attached to the side housing portion 18. A housing interior 16 may be formed by the front housing portion 17 and the side housing portion 18. A housing opening 19 may extend through the front housing portion 17 for purposes which will be hereinafter described.

As further illustrated in FIG. 7, a lock disk 20 may be disposed for rotation in the housing interior 16 of the rotational platform mount housing 15. A locking mechanism 23 on the rotational platform mount housing 15 may be configured to detachably engage the lock disk 20 to prevent rotation of the lock disk 20 in the housing interior 16 in a lock position and to disengage the lock disk 20 to facilitate rotation of the lock disk 20 in a release position. In some embodiments, the locking mechanism 23 may include at least one lock pin 24 which may be provided on the rotational platform mount housing 15. The lock pin 24 may be selectively configurable between the lock position in which the lock pin 24 detachably engages the lock disk 20 to prevent rotation of the lock disk 20 in the housing interior 16 of the rotational platform mount housing 15 and the release position in which the lock pin 24 disengages the lock disk 20 to facilitate rotation of the lock disk 20 in the housing interior 16 of the rotational platform mount housing.

In some embodiments, the locking mechanism 23 may further include a lock pin opening 25 which may extend through the side housing portion 18 of the rotational platform housing 15. The lock pin 24 may extend through the lock pin opening 25. As illustrated in FIGS. 5 and 7, a plurality of circumferentially spaced-apart disk openings 22 may be provided in an outer disk surface 21 of the lock disk 20. In some embodiments, the disk openings 22 may extend in a radial direction at 20-degree intervals or increments along the outer disk surface 21, although the number and spacing of the disk openings 22 may vary in different embodiments. As the lock disk 20 is rotated in the housing interior 16 of the rotational platform mount housing 15, the disk openings 22 may sequentially register with the lock pin opening 25 in the side housing portion 18 of the rotational platform housing 15. Accordingly, in the lock position, the lock pin 24 may be selectively insertable in a selected registering one of the disk openings 22 to prevent rotation of the lock disk 20 in the housing interior 16 of the rotational platform mount housing 15. In the release position, the lock pin 24 may disengage the disk opening 22 to facilitate rotation of the lock disk 20 in the housing interior 16 of the rotational platform mount housing 15 for purposes which will be hereinafter described. In some embodiments, the lock pin 24 may be spring-loaded in the lock position according to the knowledge of those skilled in the art. In other embodiments, the locking mechanism 23 may include alternative mechanisms which detachably engage and disengage the lock pin 24 in the lock and release positions, respectively, to prevent or facilitate rotation of the lock disk 20 in the housing interior 16 of the rotational platform mount housing 15.

A platform support member 38 may extend from and rotate with the lock disk 20. The platform support member 38 may be configured to support the platform 44 (FIG. 2) according to the knowledge of those skilled in the art. In some embodiments, the platform support member 38 may have a square cross-section. As illustrated in FIGS. 1 and 7, an opening 39 may be provided in the platform support member 38. Accordingly, the platform 44 may be detachably securable to the platform support member 38 by sliding a hollow platform frame member 45 (FIG. 2) of the platform 44 over the platform support member 38 until a securing member (not illustrated) on the platform frame member 45 inserts in the opening 39. The securing member may include a release mechanism (not illustrated) which facilitates disengagement of the securing member from the opening 39 and removal of the platform 44 from the platform support member 38. The platform support member 38 may be welded and/or otherwise attached to the lock disk 20 according to the knowledge of those skilled in the art or may be fabricated in one piece with the lock disk 20.

As further illustrated in FIG. 7, a housing ring 28 may be disposed in the housing interior 16 of the rotational platform mount housing 15 typically between the lock disk 20 and the frame plate 3 of the frame 2. The housing ring 28 may have a housing ring opening 29 which aligns or registers with the disk pin opening 6 in the frame plate 3 of the frame 2. In some embodiments, the housing ring 28 may be attached to the frame plate 3 of the frame 2 via welding, mechanical fasteners and/or other attachment technique.

A disk pin 34 may extend from the lock disk 20 through the housing ring opening 29 in the housing ring 28 and the registering disk pin opening 6 in the frame plate 3 of the frame 2. The disk pin 34 may be welded and/or otherwise attached to the lock disk 20 according to the knowledge of those skilled in the art or may be fabricated in one piece with the lock disk 20. The disk pin 34 may be secured such as by seating a lock ring 35 in a companion lock ring groove (not illustrated) in the disk pin 34, for example and without limitation.

In typical application of the rotational bracket assembly 1, the frame 2 may be secured to a support 48 and the platform 44 deployed on the rotational platform mount 14 to support a dog (not illustrated) in an elevated position during a hunting expedition. In some applications, the support 48 may be a tree. In other applications, the support 48 may be a pole or other structure. Accordingly, the plate 2 may be secured to the support 48 typically by initially placing the support engaging flanges 10 against the support 48 at a selected height as the frame plate 3 of the frame 2 is disposed in a vertical orientation, as illustrated in FIG. 1. The assembly mount members 5 may be extended through, hooked into or otherwise engaged with each corresponding pair of assembly mount member openings 7 in the frame plate 3, extended around the support 48 and fastened.

Before or after attachment of the rotational bracket assembly 1 to the support 48, the platform 44 (FIG. 2) may be attached to the platform support member 38 typically by sliding the platform frame member 45 over the platform support member 38 of the rotational platform mount 14 until the platform frame member 45 snaps into or locks in place at the opening 39 in the platform support member 38. The orientation of the platform 44 with respect to the support 48 and/or a horizontal plane may be selected by initially deploying the lock pin 24 in the release position, typically against spring bias, while rotating the platform 44 to the desired angular orientation as the lock disk 20 rotates in the housing interior 16 of the rotational platform housing 15 and the disk openings 22 in the outer disk surface 21 of the lock disk 20 sequentially align or register with the lock pin opening 25 in the side housing portion 18 of the rotational platform housing 15. At the desired angular orientation of the platform 44, the lock pin 24 may be deployed from the release position to the lock position such that the lock pin 24 inserts into the corresponding disk opening 22. The lock pin 24 thus prevents further rotation of the lock disk 20 in the housing interior 16 and therefore secures or stabilizes the platform 44 in the desired angular orientation. The hunting dog (not illustrated) typically sits on the platform 44 as the hunter sits on a deer stand which may be secured to a tree or other support in the same area as the support 48 to which the rotational bracket assembly 1 is secured.

After use, the rotational bracket assembly 1 may be removed from the support 48 typically by releasing and removing the assembly mount members 5 from around the support 48. The platform 44 may be removed from the platform support member 38 for ease and efficiency in transport and storage of the rotational bracket assembly 1.

It will be appreciated by those skilled in the art that the rotational bracket assembly 1 may be fabricated of metals such as aluminum or steel, plastics, composite materials or any combination thereof using casting, molding, machining and/or other fabrication techniques known by those skilled in the art. The rotational bracket assembly 1 may facilitate adjustment of the angular orientation of the platform 44 with respect to the support 48 and/or a horizontal plane to compensate for leaning of the support 48 at any angle with respect to the ground. The rotational bracket assembly 1 may be amenable to a variety of other applications in which it is desired to secure a dog stand or other type of support or platform 44 to a tree, pole or other support 48 and adjust the angular orientation of the platform 44.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A rotational bracket assembly for securing a platform to a support at a selected angle, comprising:
    a frame configured to be secured to the support; and
    a rotational platform mount carried by the frame, the rotational platform mount including:
        a rotational platform mount housing having:
            a ring-shaped, cylindrical or annular side housing portion:
            a front housing portion provided on the side housing portion; and
            a housing opening extending through the front housing portion, the housing opening having a circular boundary:
        a lock disk enclosed by and disposed for rotation in the rotational platform mount housing;
        a locking mechanism carried by the rotational platform mount housing, the locking mechanism configurable between a lock position detachably engaging the lock disk to prevent rotation of the lock disk in the rotational platform mount housing and a release position disengaging the lock disk to facilitate rotation of the lock disk in the rotational platform mount housing; and
        a platform support member extending from and rotatable with the lock disk, the platform support member configured to support the platform.

2. The rotational bracket assembly of claim 1 wherein the locking mechanism comprises at least one lock pin opening in the rotational platform mount housing and at least one lock pin extending through the at least one lock pin opening, the at least one lock pin selectively configurable between the lock position extending into the rotational platform mount housing and detachably engaging the lock disk to prevent rotation of the lock disk in the rotational platform mount housing and the release position withdrawn from the rotational platform mount housing and disengaging the lock disk to facilitate rotation of the lock disk in the rotational platform mount housing.

3. The rotational bracket assembly of claim 2 wherein the locking mechanism further comprises a plurality of circumferentially spaced-apart disk openings in the lock disk, and wherein the disk openings sequentially register with the at least one look pin opening as the lock disk is rotated in the rotational platform mount housing and the lock pin is selectively insertable in a selected one of the disk openings in the lock position to prevent rotation of the lock disk in the rotational platform mount housing.

4. The rotational bracket assembly of claim 2 wherein the at least one lock pin is spring-loaded in the lock position.

5. The rotational bracket assembly of claim 1 wherein the frame comprises a frame plate and a pair of spaced-apart plate flanges extending from the frame plate.

6. The rotational bracket assembly of claim 5 further comprising a pair of spaced-apart support engaging flanges carried by the frame plate.

7. The rotational bracket assembly of claim 5 further comprising at least one pair of assembly mount member openings extending through the frame plate.

8. The rotational bracket assembly of claim 7 further comprising an assembly mount member engaging the assembly mount member openings.

9. A rotational bracket assembly for securing a platform to a support at a selected angle, comprising:
- a frame configured to be secured to the support; and
- a rotational platform mount carried by the frame, the rotational platform mount including:
  - a rotational platform mount housing having:
    - a ring-shaped, cylindrical or annular side housing portion;
    - a front housing portion on the side housing portion;
    - a housing opening in the front housing portion, the housing opening having a circular boundary; and
    - a housing interior formed and enclosed by the side housing portion and the front housing portion;
  - a lock disk enclosed by the rotational platform mount housing and disposed for rotation in the housing interior of the rotational platform mount housing;
  - a locking mechanism including:
    - at least one lock pin carried by the rotational platform mount housing, the at least one lock pin selectively configurable between a lock position extending into the rotational platform mount housing and detachably engaging the lock disk to prevent rotation of the lock disk in the housing interior of the rotational platform mount housing and a release position withdrawn from the rotational platform mount housing and disengaging the lock disk to facilitate rotation of the lock disk in the housing interior of the rotational platform mount housing; and
  - a platform support member extending from and rotatable with the lock disk, the platform support member extending through the housing opening of the rotational platform mount housing and configured to support the platform.

10. The rotational bracket assembly of claim 9 wherein the locking mechanism comprises at least one lock pin opening in the rotational platform mount housing, and the at least one lock pin extends through the at least one lock pin opening.

11. The rotational bracket assembly of claim 10 wherein the locking mechanism comprises a plurality of circumferentially spaced-apart disk openings in the lock disk, and the disk openings sequentially register with the at least one lock pin opening as the lock disk is rotated in the rotational platform mount housing and the lock pin is selectively insertable in a selected one of the disk openings in the lock position to prevent rotation of the lock disk in the rotational platform mount housing.

12. The rotational bracket assembly of claim 9 wherein the at least one lock pin is spring-loaded in the lock position.

13. The rotational bracket assembly of claim 9 wherein the frame comprises a frame plate and a pair of spaced-apart plate flanges extending from the frame plate.

14. The rotational bracket assembly of claim 13 further comprising a pair of spaced-apart support engaging flanges carried by the frame plate.

15. The rotational bracket assembly of claim 13 further comprising at least one pair of assembly mount member openings extending through the frame plate.

16. The rotational bracket assembly of claim 15 further comprising an assembly mount member engaging the assembly mount member openings.

17. A rotational bracket assembly for securing a platform to a support at a selected angle, comprising:
- a frame configured to be secured to the support, the frame including:
  - an elongated, rectangular frame plate having parallel longitudinal frame plate side edges;
  - a pair of spaced-apart plate side flanges extending from the longitudinal frame plate side edges, respectively, of the frame plate;
  - a disk pin opening extending through the frame plate; and
  - at least one pair of assembly mount member openings in the frame plate; and
- a rotational platform mount carried by the frame plate of the frame, the rotational platform mount including:
  - a rotational platform mount housing having:
    - a ring-shaped, cylindrical or annular side housing portion;
    - a front housing portion on the side housing portion;
    - a housing opening in the front housing portion, the housing opening having a circular boundary;
    - at least one lock pin opening in the side housing portion; and
    - a housing interior formed and enclosed by the side housing portion and the front housing portion;
  - a lock disk enclosed by the rotational platform mount housing and disposed for rotation in the housing interior of the rotational platform mount housing, the lock disk having an outer disk surface;
  - a locking mechanism including:
    - a plurality of circumferentially spaced-apart disk openings in the outer disk surface of the lock disk, the disk openings sequentially register with the at least one lock pin opening as the lock disk is rotated in the housing interior of the rotational platform mount housing; and
    - at least one lock pin extending through the at least one lock ping opening in the side housing portion of the rotational platform mount housing, the at least one lock pin selectively configurable between a lock position extending into the rotational platform mount housing and detachably inserting in a selected one of the disk openings to prevent rotation of the lock disk in the housing interior of the rotational platform mount housing and a release position withdrawn from the rotational platform mount housing and disengaging the selected one of the disk openings to facilitate rotation of the lock disk in the rotational platform mount housing;
  - a housing ring disposed in the housing interior of the rotational platform mount housing adjacent to the lock disk;
  - a housing ring opening in the housing ring;
  - a disk pin extending from the lock disk through the housing ring opening of the housing ring and the disk pin opening in the frame plate;
  - a platform support member extending from and rotatable with the lock disk, the platform support member extending through the housing opening; and
  - a platform carried by the platform support member, the platform having a hollow platform frame member slid and secured over the platform support member.

18. The rotational bracket assembly of claim 17 wherein the lock pin is spring-loaded in the lock position.

19. The rotational bracket assembly of claim 17 further comprising an assembly mount member engaging the assembly mount member openings.

20. The rotational bracket assembly of claim 17 further comprising a pair of spaced-apart support engaging flanges carried by the frame plate.

* * * * *